United States Patent [19]
Bonar

[11] Patent Number: 5,233,230
[45] Date of Patent: Aug. 3, 1993

[54] POWER CORD

[76] Inventor: George D. Bonar, 333 Bowery, New York, N.Y. 10003

[21] Appl. No.: 519,113

[22] Filed: May 4, 1990

[51] Int. Cl.⁵ .............................................. H02J 9/00
[52] U.S. Cl. .......................................... 307/64; 320/2; 307/128; 307/150
[58] Field of Search ................. 320/2; 307/125, 126, 307/128, 147, 150, 64, 66

[56] References Cited

U.S. PATENT DOCUMENTS

| | | | |
|---|---|---|---|
| 3,201,742 | 3/1962 | English | 320/2 |
| 3,530,350 | 9/1970 | Gawron et al. | 318/807 |
| 3,766,403 | 10/1973 | Tsutsumi | 307/66 |
| 3,968,417 | 7/1976 | Dials | 320/2 |
| 4,139,880 | 2/1979 | Ulmer et al. | 307/127 |
| 4,620,110 | 10/1986 | Cooney | 307/48 |
| 4,957,831 | 9/1990 | Meredith et al. | 320/2 |

Primary Examiner—Jeffrey A. Gaffin
Attorney, Agent, or Firm—John B. Dickman, III

[57] ABSTRACT

An electrical power cord for connecting an a.c. current source to an appliance, and a d.c. current battery power pack connected to the power cord to replace a.c. current when there is a loss of a.c. current. Switches in the battery power pack provide for switching from a.c. to d.c. current. This provides and maintains continuous instant, portable power for appliances.

12 Claims, 2 Drawing Sheets

POWER CORD

BACKGROUND OF THE INVENTION

Heretofore the loss of electric power resulted in the loss of all electrical appliances, electricity to operate lights and heating controls. There are a number of small appliances and lighting sources which are capable of operating on either a.c. or d.c. current; therefore, it is possible to switch from alternating current (a.c.) to direct current (d.c.) when the source of a.c. current has been lost. Also a lack of maintaining continuous portable power for instant travel.

Frequently, electrical power outages are caused by either natural or man made consequences. For example, during wind, rain and electrical storms, electrical power is often lost from downed power lines. Transformers are often damaged by lighting. In addition, man sometimes through accident damages power lines. Also, when making electrical repairs electric service is usually cut off to prevent health accidents.

In the past, the loss of electrical power required a supply of candles, and battery operated lanterns to light a house. In many cases, battery operated radios are used for communication. However, without a supply of fully charged or fresh batteries, many of these small appliances will not work. In short, there is a need for the present invention which provides a power electric cord for normal a.c. current operation and emergency d.c. current for power outages.

SUMMARY OF THE INVENTION

The present invention relates to an electrical power cord for use with a.c. current appliances such as radios, clocks, TV, lamps and the like, that can be switched to d.c. current on power outages for use with small appliances that will operate on d.c. current, and provide portable power.

The electrical power cord of this invention has a battery power pack for d.c. emergency use, otherwise the primary use of the cord is like any other electric cord. The battery power pack has a battery charger incorporated therein, to automatically charge the batteries during normal a.c. current operations.

In one embodiment of the invention, the electric power cord is switched from a.c. current to d.c. current manually. A simple push-pull switch closes the circuitry for sending d.c. current to the connected appliance.

In another embodiment of the invention, the electric power cord is switched automatically from a.c. current to d.c. current. A voltage tester is built into the battery power pack to detect voltage drops and trigger switching to d.c. current. Some appliances like digital clocks must have continuous electric current otherwise they flash "on" and "off" and revert to a starting point until reset. The automatic switching to d.c. current is done in microseconds and avoids having to reset said appliances.

It is a primary object of this invention to provide an electric power cord with an emergency d.c. current power pack.

It is another object of this invention to provide an electric power cord with means to switch from a.c. to d.c. to provide portable power.

Still another object of this invention is to provide an electric power cord with means to automatically switch from a.c. to d.c. in the case of an electrical power outage.

These and other objects will become apparent from the drawings and the following description.

DESCRIPTION OF THE INVENTION

Figure 1:
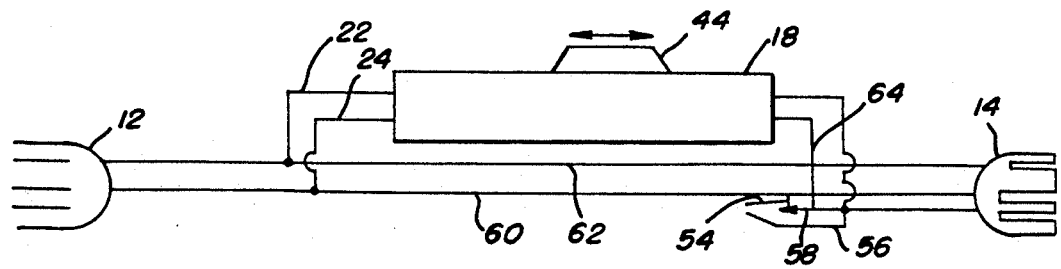
FIG. 1 is a block diagram of an electric power cord of this invention.
Figure 2:
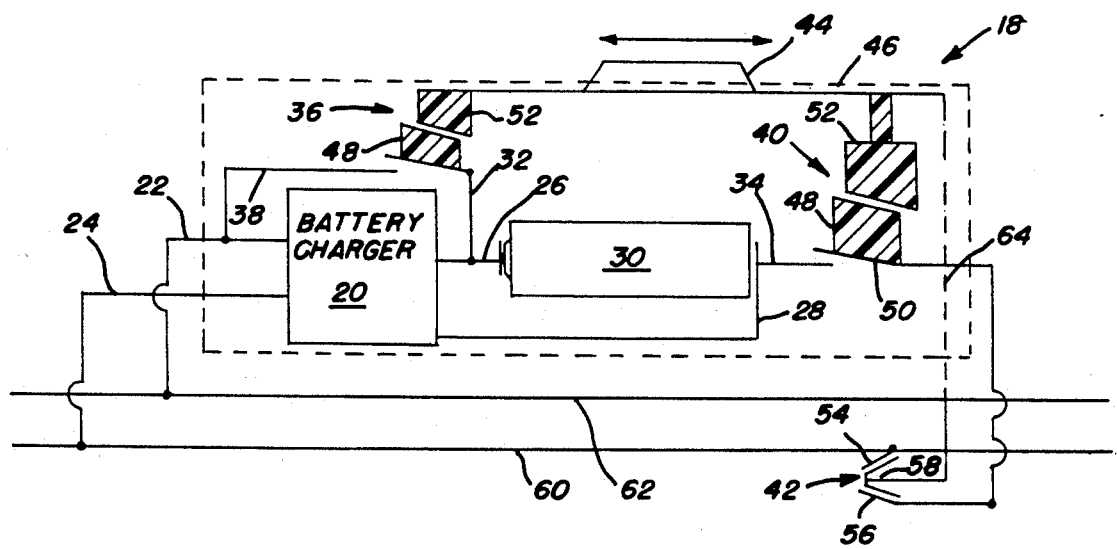
FIG. 2 is a detailed diagram of an electric power cord of this invention.
Figure 3:
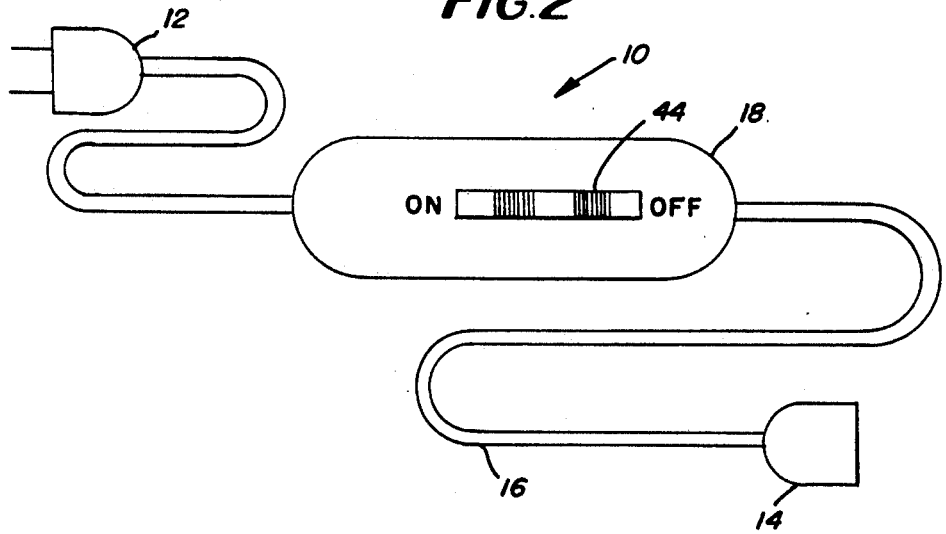
FIG. 3 is a top view of an electric power cord of this invention.

Referring to FIGS. 1-5 there is shown an electrical power cord 10 of the present invention. FIG. 3 shows a power cord 10 with a plug 12 for plugging into conventional wall sockets, etc. Power cord 10 has a two prong receptacle 14 connected to the plug 12 by an electric cord 16. A battery power pack 18 is electrically wired in the electric cord 16 to provide an emergency source of d.c. current when an a.c. power outage occurs.

The battery power pack 18 has a battery charger 20 and a battery holder, not shown in detail. The battery charger 20 is a conventional battery charger which converts 120 volts a.c. current input to 1.45 volts d.c. current output. Higher output may be used for charging higher voltage batteries, or where larger banks of batteries are charged at one time. Wire leads 22 and 24 connect the charger 20 to the electric cord wires 62 and 60, respectively. Output from the charger 20 is in the form of a positive wire lead 26 and a negative wire lead 28. Positive wire lead 26 connects to the positive end of a battery or batteries 30. Negative wire lead 28 connects to the negative end of the battery.

In order to use the batteries 30 as an emergency source of d.c. current, a wire lead 32 connects the positive end of the batteries 30 to wire lead 22 connected to the power cord wire 62. A wire lead 34 is connected to the power cord, as will be explained. Wire lead 32 connects to the power cord wire 62 via a switch 36 and contact wire lead 38, and wire lead 34 connects to the power cord via a switch 40 connected to a slave switch 42 wired to the power cord wire 60.

Switches 36 and 40 are operated simultaneously by a slide lever 44. A bar 46 attached to each switch 36 and 40 is moved by the slide lever 44 to open or close the switches. Each switch has non-conductive cam block 48 mounted on a metal contact 50 and a non-conductive cam block 52 mounted on bar 46. The switches 36 and 40 are operated by sliding the bar 46 to the "on" position whereby the cam surfaces of blocks 52 slide across the cam surfaces of blocks 48, pressing blocks 48 down, thus closing the metal contacts 50 on wire leads 34 and 38. Closing the switches allows d.c. current to flow from the battery pack through the power cord to an appliance and back through the power cord to the battery pack.

Slave switch 42 is connected to the bar 46 to move with switches 36 and 40 to "open" and close as they do to complete the circuit from the negative side of the battery pack and the power cord 16. Switch 42 has a pair of wire contacts 54 and 56 and a movable contact 58. Contact 54 is connected to power cord wire 60, and contact 56 is connected to metal contact 50 of switch 40. Contact 58 is connected to bar 46 by a non-conductive means 64 between the bar and the contact. When the bar 46 forces switches 36 and 40 closed, movable contact 58 is also closed to complete the circuit. It is possible to connect the metal contact 50 directly to wire 60 and eliminate switch 42. The use of switch 42 is a safety factor and recommended.

Figure 4:
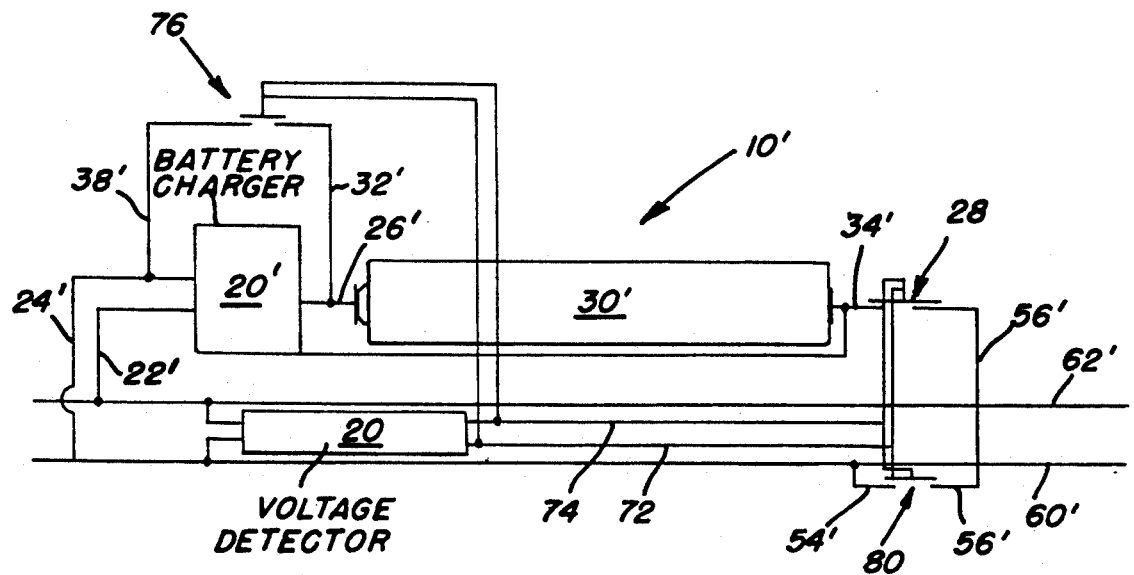
FIG. 4 is a block diagram of another embodiment of the present invention.
Figure 5:
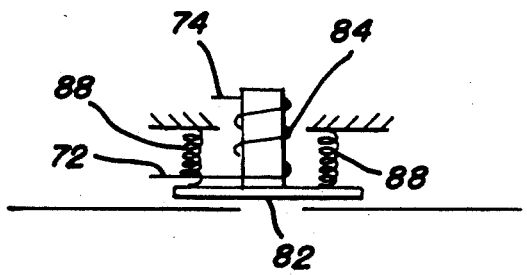
FIG. 5 is a side view of a switch for use with the embodiment of FIG. 4.

FIGS. 4 and 5 show another embodiment of the invention where the electric power cord 10' automatically switches from a.c. to d.c. current. There is a voltage detector 70 connected to power cord wires 60' and 62' to detect loss of voltage from an a.c. current source. The voltage detector 70 has output leads 72 and 74 which connect to electromagnetic switches 76, 78 and 80. The switches function similar to switches 36, 40 and 42 to "open" and "close" the d.c. circuit for emergency use.

The electromagnetic switches 76, 78 and 80 are identical, having a reciprocating contact 82, held in an open position by electric current coil 84 receiving current from the a.c. current output of the voltage detector 70 and the magnetic iron co material of the stem 84 of contact 80. When the a.c. current is cut off contact 82 is forced against the stationary contacts by spring means 88.

The various switches disclosed in the two embodiments are representations of two preferred types of switches. There . are commercially available switches which can also be used. The only requirement is that the switches be of a size which keeps the battery pack at a reasonable size.

While the invention has been described in the description and drawings, it is understood that one skilled in the art may realize other embodiments of the invention; therefore one should consider the drawings, description and claims for a complete understanding.

I claim:

1. An electrical power cord for use with A.C. current and D.C. current, to switch from A.C. current to D.C. current when there is a loss of A.C. current comprising:
   a male plug means for connecting to a source of A.C. current, said male plug means connected to one end of an electrical cord having first and second wires;
   a female receptacle connected to the other end of said electrical cord, said female receptacle receiving a male plug from an appliance to carry A.C. current from an A.C. current source to the appliance;
   a D.C. battery operated power pack integral with said electrical cord to provide D.C. current to an appliance capable of operating with either A.C. or D.C. current when there is a loss of A.C. current at the source;
   means to switch from A.C. current to D.C. current, said means having a first switch and a second switch which operate simultaneously to switch the power cord from A.C. current to D.C. current, said first switch being connected to the positive end of said battery pack, and to said first wire of said power cord, said second switch being connected to the negative end of said battery pack and said second wire of said power cord to provide D.C. current to said power cord when said means to switch from A.C. current to D.C. current are switched to the "on" position.

2. An electrical power cord as in claim 1 wherein said power pack includes a battery charger means for recharging the battery pack using a.c. current.

3. An electrical power cord as in claim 2 wherein said power pack includes a third switch between said second switch and said second wire of said power cord where said third switch operates simultaneously with said second switch to provide a safety switch to avoid malfunctions.

4. An electrical power cord as in claim 3 wherein said switching means is manually operated.

5. An electrical power cord as in claim 4, wherein said first switch and said second switch each having a first block with an inclined cam surface and a second block with an inclined cam surface to slide on said first block, a means to move said means from A.C. current to D.C. current, said first blocks being connected to said means to move said switching means.

6. An electrical power cord as in claim 3 wherein said switching means is automatic, having a voltage detection means to detect a loss of voltage and said switch means being controlled by said voltage detecting means to close said switches when there is a loss of voltage.

7. An electrical power cord for appliances which operate on either a.c. current or d.c. current and where the power cord is movable from one appliance to another comprising:
   a male plug means for connecting to a source of a.c. current, said male plug means connected to one end of an electrical cord, said electrical cord having a first wire and a second wire;
   a female receptacle connected to the other end of said electrical cord, said female receptacle receiving a male connector from an appliance to carry a.c. current from an a.c. current source to the appliance;
   a d.c. power pack means integral with said electrical cord to provide d.c. current to an appliance capable of. operating with either a.c. current or d.c. current when there is a loss of a.c. current at the source, wherein said d.c. power is a d.c. battery operated power pack;
   a switching means including a first switch and a second switch which operate simultaneously to close said switching means, where said switching means connects said d.c. power pack means to said electrical cord;
   said d.c. power pack means having a d.c. battery means with a first end and a second end, said battery means connected at said first end to said first switch and to said second switch at said second end; and
   means to move said switching means from a.c. current to a d.c. current.

8. An electrical power cord as in claim 7 wherein said first switch and said second switch each having a first block with an inclined cam surface and a second block with an inclined cam surface to slide on said first block, said first blocks being connected to said means to move said switching means.

9. An electrical power cord as in claim 8 wherein said power pack includes a battery charger means for recharging the battery pack using a.c. current.

10. An electrical power cord as in claim 9 wherein said power pack includes a third switch between said second switch and said second wire of said power cord where said third switch operates simultaneously with said second switch to provide a safety switch to avoid malfunctions.

11. An electrical power cord as in claim 10 wherein said switching means is automatic, having a voltage detection means to detect a loss of voltage and said switch means being controlled by said voltage detecting means to close said switches when there is a loss of voltage.

12. An electrical power cord for use with A.C. house current and being switchable to D.C. current where the electrical power cord is used to provide electrical current to A.C. appliances, D.C. appliances and AC/DC appliances comprising:

an electrical power cord having a male plug means on a first end for connecting to a source of a.c. house current, and a female receptacle on a second end;

a d.c. power pack means integral with said electrical power cord to provide a source of d.c. current to d.c. appliances and a.c./d.c. appliance, said d.c. power pack having means to switch said electrical power cord from a.c. house current to d.c. battery current;

said means to switch said electrical power cord from a.c. house current to d.c. battery current including a first switch means and a second switch means connected by a reciprocating bar, sand first switch means and said second switch means each having a first beveled block on a metal contact and a second beveled block on said reciprocating bar, whereby said reciprocating bar moves said second beveled blocks across said first beveled block pressing said metal contacts down, closing said metal contacts on wire leads to allow d.c. current to flow through said electrical power cord to an appliance;

said electrical power cord having a first electrical wire and a second electrical wire connected to said male plug on said first end and connected to said female receptacle on said second end, and a safety switch means in said first electrical wire of said electrical power cord, and safety switch means having a first contact means connected to said metal contact of said first switch means, a second contact means connecting said safety switch means to said first electrical wire of said electrical power cord, and a third movable contact means to contact said first and second contact means, an insulated means connecting said third movable contact means to said reciprocating bar to move said third movable contact into and out of contact with said first and second contacts.

* * * * *